United States Patent [19]

Pol et al.

[11] Patent Number: 4,857,265

[45] Date of Patent: Aug. 15, 1989

[54] WIRING INSTALLATION FOR CONNECTION OF ELECTRIC DEVICES OF A NUCLEAR REACTOR

[75] Inventors: Dejeux Pol, Nogent Sur Marne; Desfountaines Guy, Puteaux, both of France

[73] Assignee: Framatome, Courbevoie, France

[21] Appl. No.: 137,029

[22] Filed: Dec. 23, 1987

[30] Foreign Application Priority Data

Dec. 24, 1986 [FR] France .................................. 8618165

[51] Int. Cl.[4] .......................... G21C 17/00; G21D 1/02
[52] U.S. Cl. ....................................... 376/463; 376/263
[58] Field of Search ................. 376/263, 262, 463, 259

[56] References Cited

U.S. PATENT DOCUMENTS

| | | | |
|---|---|---|---|
| 4,158,599 | 6/1979 | Andrews et al. | 376/263 |
| 4,302,290 | 11/1981 | Mazur et al. | 376/463 |
| 4,683,106 | 7/1987 | Jahnke | 376/463 |

FOREIGN PATENT DOCUMENTS

| | | | |
|---|---|---|---|
| 0211108 | 2/1987 | European Pat. Off. | 376/463 |
| 1462213 | 3/1969 | Fed. Rep. of Germany | |
| 2100496 | 12/1982 | United Kingdom | 376/263 |

Primary Examiner—Brooks H. Hunt
Assistant Examiner—Daniel Wasil
Attorney, Agent, or Firm—Pollock, Vande Sande & Priddy

[57] ABSTRACT

A wiring installation for electrical connections of a plurality of devices of a nuclear reactor, comprising:

(a) a plurality of first multiwire cables each extending at least from certain ones of said devices and terminated with a first connector located above said cover at an end remote from said device, and (b) a plurality of second multiwire cables each for connection with a respective one of the first cables and each having a first section having a first multicable connector having a plurality of electrical contacts connected to respective wires of said section, said first multicables connector being common to at least ten independent first sections, and a second section having a second multicable connector having a plurality of electrical contacts connected to respective wires of said second section and corresponding to respective wires of said first section for removable connection to said first multicables connector.

8 Claims, 8 Drawing Sheets

WIRING INSTALLATION FOR CONNECTION OF ELECTRIC DEVICES OF A NUCLEAR REACTOR

BACKGROUND OF THE INVENTION

The present invention relates to wiring installations for electric devices for a nuclear reactor having a removable cover, devices such as sensors for measuring the position of the control clusters, actuators for these clusters, thermocouples, etc. The invention is particularly suitable, although not exclusively, for reactors cooled and moderated with light water having a large number of control clusters which could cause problems when defective cables are to be changed or during connection/disconnection operations on electric devices.

Wiring installations are already known for nuclear reactor electric devices. The documents FR-A-No. 2 567 305 corresponding to U.S. Pat. No. 4,683,106 (Jahnke) shows an installation of the type including for each of the electric devices, a plurality of first cable each extending from one of said devices and terminated with a first fixed connector located above the reactor cover and a plurality of second cables each corresponding to a respective first cable and each having two connectors at the ends thereof, one for disconnectable connection to one of the first fixed connector located above the cover and the other for disconnectable connection to a second fixed connector carried by a plate remote from the reactor vessel. The second cable has a first section placed inside a sealed sheath installed horizontally above the cover and a second section for connection to the second fixed connector carried by the plate remote from the reactor.

This wiring installation overcomes numerous problems. However, when opening the cover of the reactor, it is necessary to disconnect numerous cables and their respective sections for access to the inside of the vessel. On the contrary, when closing the cover, all these cables must be reconnected one by one with risk of error.

By way of example, for a known pressurized water nuclear reactor, having four cooling loops, the number of control and shut down clusters is 73 and the number of thermocouples 52. For each control cluster exists a cable for supplying power for the controlling mechanisms of the cluster and a measuring cable for the sensor measuring the position of the cluster. There is also one mesuring cable per thermocouple, which makes a total of 198 cables.

Installing these cables is a long, delicate operation carried out under difficult access conditions. In addition, the connection of the different connectors during operations for opening/closing the cover of the reactor is carried out in an hostile environment due to the core radioactivity.

In certain cases the cables must comply with high radii of curvature and the small amount of room available above the cover does not alow the presence of extra superfluous lengths. These must then be cut on the spot, under the difficult conditions mentioned above.

It is an object of the present invention to provide an improved wiring installation. It is a more particular object to provide a device which renders possible:

a reduction of time of intervention on the reactor, therefore improving the availability of the nuclear reactor for producing power, and a minimization of the irradiation of the working staff, a lower deterioration of the cable connections of the wiring installation, a reduction of the risk of errors during reconnection of the cables after intervention on the cover of the reactor or in case of changing a damaged cable.

For that purpose, the invention proposes in combination with a nuclear reactor having a vessel provided with a removable cover, a wiring installation for electrical connections of a plurality of devices of the nuclear reactor, comprising:

(a) a plurality of first multiwire cables each extending at least from certain ones of said devices and terminated with a first connector located above said cover at an end remote from said device, (b) a plurality of second multiwire cables each for connection with a respective one of the first cables and each having:

(b$_1$) a first section having at a proximal end thereof one second connector for disconnectable connection to one of said first connectors and at a distal end thereof a third connector, (b$_2$) a second section having at a proximal end thereof a fourth connector for disconnectable connection to said third connector and at a distal end thereof a first multicables connector having a plurality of electrical contacts connected to respective wires of said second section, said first multicables connector being common to at least ten independent second sections, (b$_3$) a third section having at a proximal end thereof a second multicables connector having a plurality of electrical contacts connected to respective wires of said third section and corresponding to respective wires of said second section, said second multicables connector being common to at least ten independent third sections corresponding to said independent second sections for removable connection to said first multicables connector, and at a distal end thereof a fifth connector for connection with a respective sixth connector fixed on a plate remote from the reactor vessel.

The presence of multicables connecors, able to be connected and disconnected quickly, reduce considerably the intervention time of operations of the reactor. The risks of error during reconnection are furthermore eliminated.

It is another object of the invention to provides a wiring installation, further comprising supporting means for the second multiwires cables having:

first sections supporting means comprising a plurality of rigid conduits arranged above the cover in a plurality of layers perpendicular to the axis of the reactor vessel, the conduits in each layer being parallel to each others, and, conduits supporting means comprising a modular metallic structure supporting each one of said plurality of layers.

It is another object of the invention to provide a wiring installation wherein the supporting means for said second multiwire cables further comprise third section supporting means arranged for pivoting about one fixed pivot and supporting third sections of second multiwire cables corresponding to a natural number of second multicables conectors connected thereof. After disconnection of the multicable connectors and by causing the support means to pivot, the top of the cover may thus be readily freed.

In another advantageous embodiment, it could be made recourse to one of the following arrangements:

the rigid conduits are each formed with a sealed metallic duct for containing a plurality of first sections of second multiwire cables, said first sections being drowned into an isolating product resisting to radiations, the first multiwire cables penetrate into corresponding rigid conduits through penetrations, said penetrations being regularly disposed on lateral surfaces of said conduits according to the position of the respective devices connected to said first multiwire cables, each second connector is fixed on the surface of a corresponding conduit, at least some of the second multiwire cables have their third connector fixed ona lateral surface of the corresponding conduit, the first multicables connectors and the corresponding second multicables connectors are connectable and disconnectable automatically.

The invention will be better understood from the following description of a particular embodiment given by way of non limitative example.

SHORT DESCRIPTION OF THE DRAWINGS

FIG. 1a is a diagrammatic side view of a nuclear reactor in a concrete enclosure including a wiring installation according to the invention, FIG. 2 is an isometric and diagrammatic view showing the device of the invention in its environment, FIG. 3 shows, in a top view, a detail of the wiring installation of the invention at the level of the multicables connectors, FIG. 4 is an elevational view of the supporting means of a multicables connector, FIG. 5 is a partial top view of the mechanism for handling the control clusters of a pressurized water nuclear reactor showing the lead-downs for the power and control cables on the device, FIG. 6 shows one schematic embodiment of a multicables connector, and FIG. 7 shows a front view of another possible embodiment, in schematical form, of a multicables connector of the invention.

FIG. 1a shows a reactor vesel 1 having a cover 2 and placed in a concrete enclosure 3. Electric devices such as control mechanisms for the control clusters, thermocouples or sensors for measuring the position of the clusters in the core are provided. These elements which are known, have not been shown. These devices are fed with power through cables guided inside the tubes 4. Tubes of this kind also serve for guiding the cables for transferring the control informations controlling the operations of these devices, and informations from position and temperature sensors.

These cables are then distributed transversely and supported by means 5 disposed horizontally above the cover of the reactor. The cables are then connected to first multicables connectors 6 comprising at least ten different cables or so, but advantageously several tens of such cables. Each first multicables connector 6 is itself connected to a second multicables connector 6' to which the corresponding cables are connected, which then extend supported by a cables path 7 and are connected respectively through connectors to fixed plates 8 remote from the reactor.

FIG. 1b is a top view of FIG. 1a.

Figure 1A:
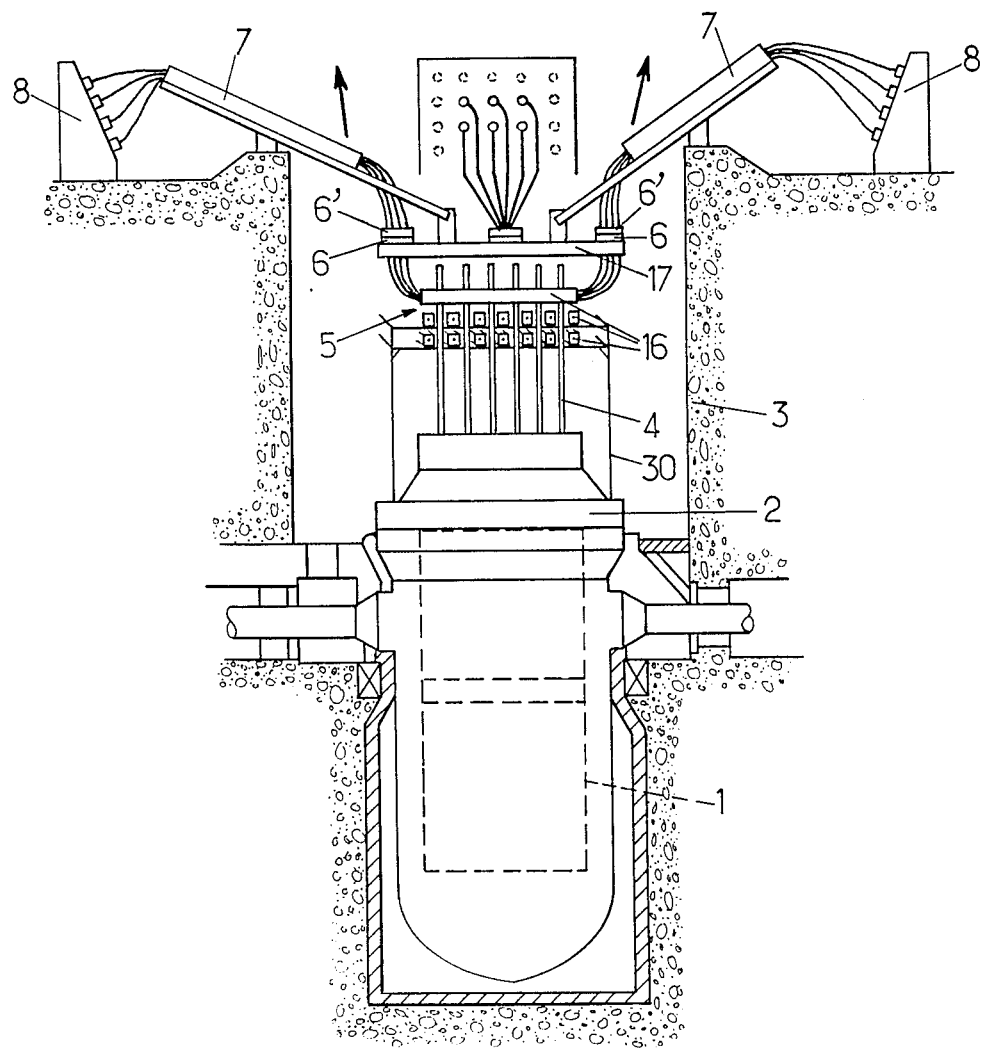

Device 9 placed inside the vessel of reactor 1, or not, has a first multiwire cable 10 connected to device 9 and the end of which opposite the device is connected to a coupling first connector 11, located above the cover 2 of the reactor. A second multiwire cable 12 has one movable second connector 13 at a proximal end thereof for disconnectable connection to the coupling first connector 11 and a mobile fifth connector 14 at the other end thereof for disconnectable connection to a fixed sixth connector 15, fixed to the plate 8 remote from the reactor vessel.

Figure 2:
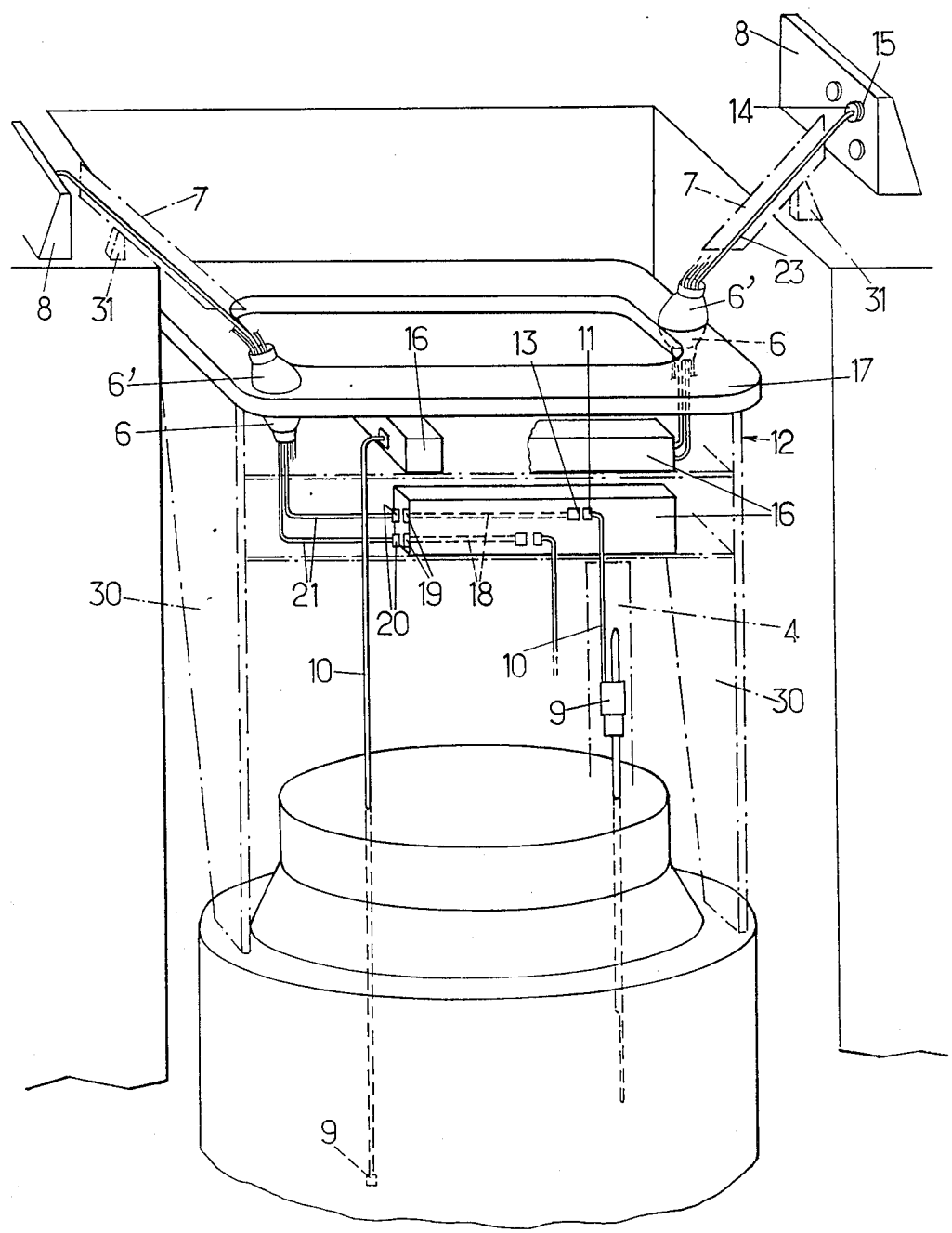
FIG. 2 shows more precisely an electric device wiring installation of the invention.

Support means 4, 16, 7, 17, shown schematically in FIGS. 1a and 2, are provided so as to hold the second cables 12 structurally in position.

The second cables 12 are formed of a first section 18 having a movable second connector 13 at one end thereof and, a movable third connector 19 at the other end thereof for disconnectable connection to a fourth connector 20 of a second section 21. This second section 21 has at one end thereof said fourth connector 20, and at the other end therof, a multicables connector 6 to which at least ten other independent second sections are alos connected, but more generally several tens of second sections of second cables.

Figure 1B:
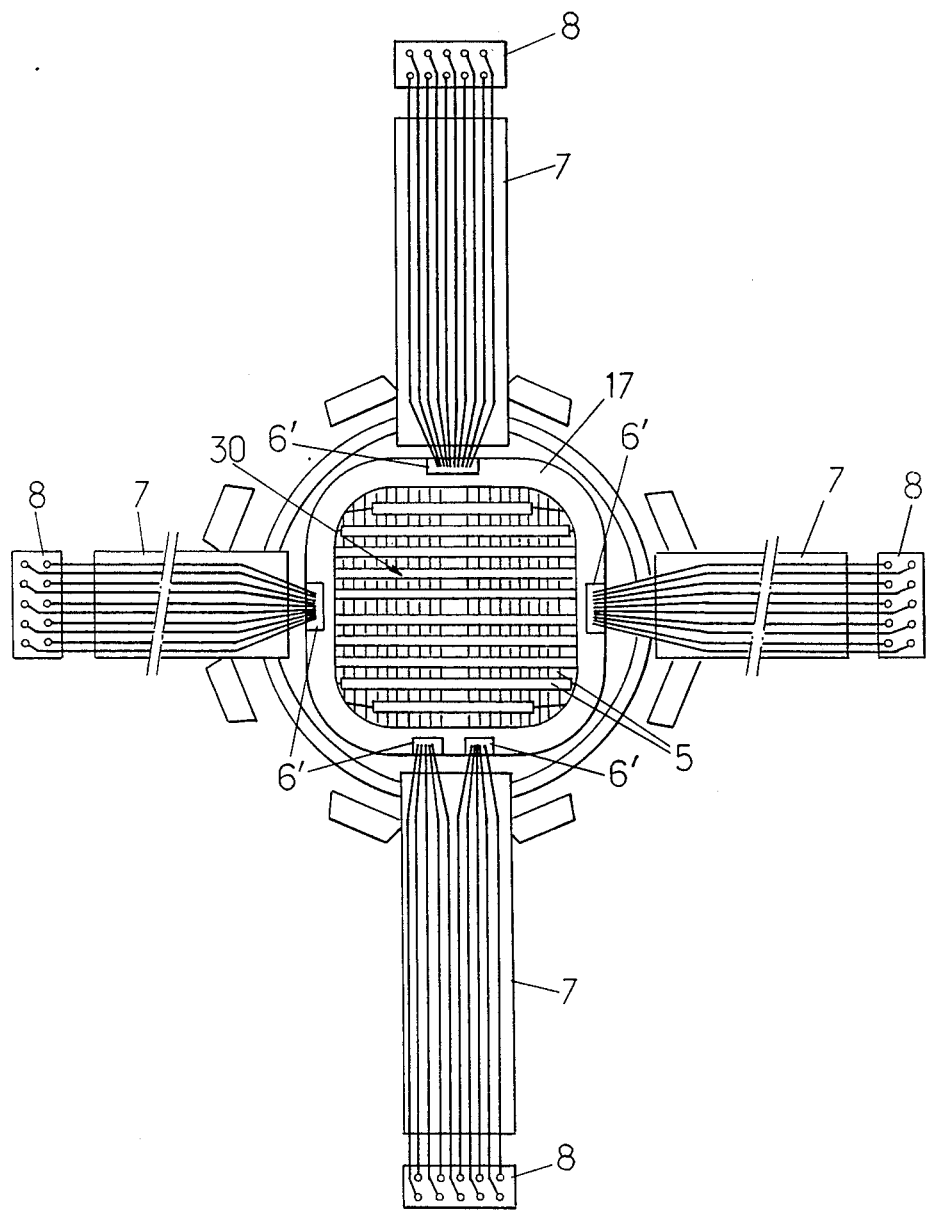
Figure 3:
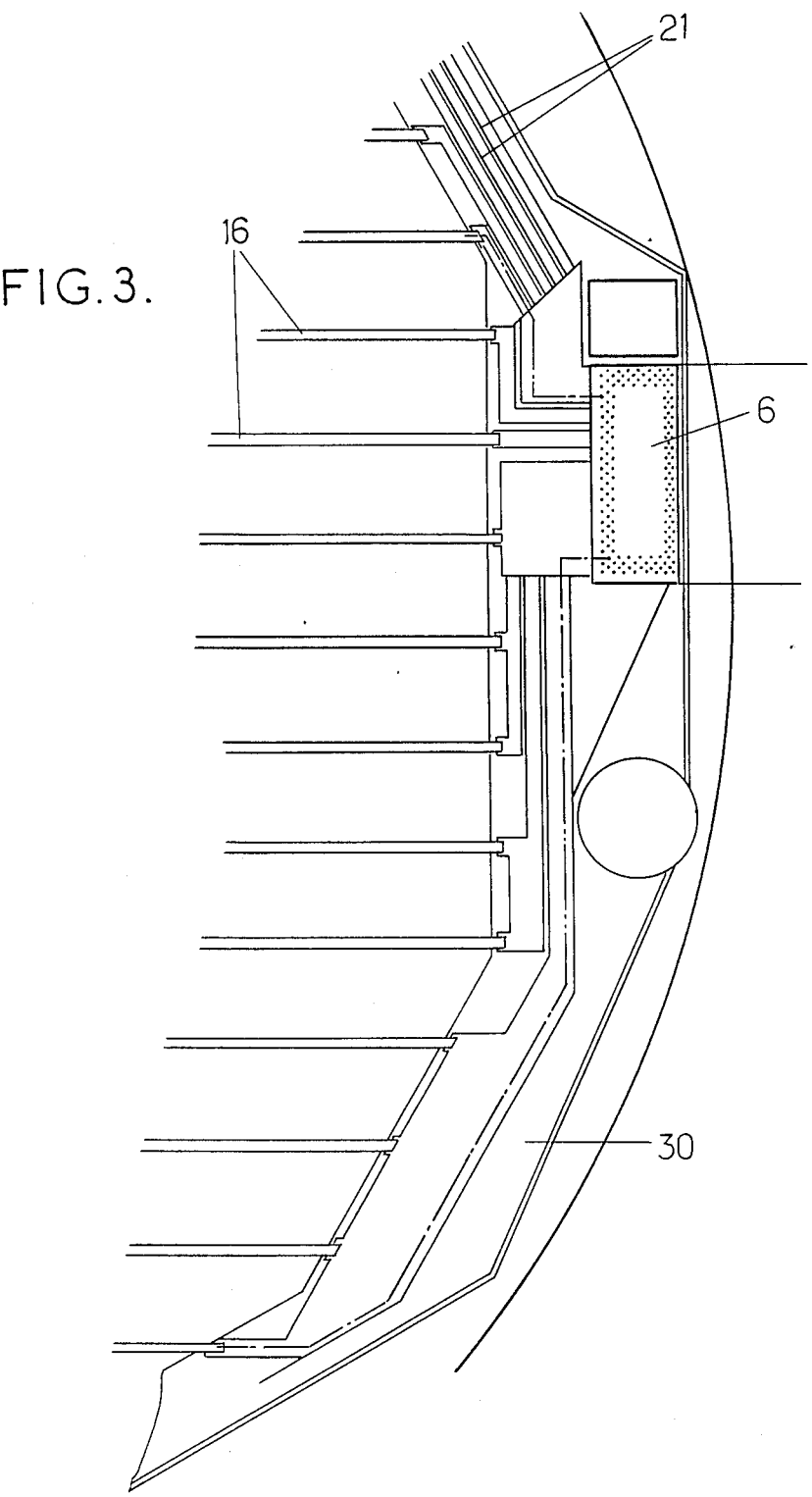
Figure 5:
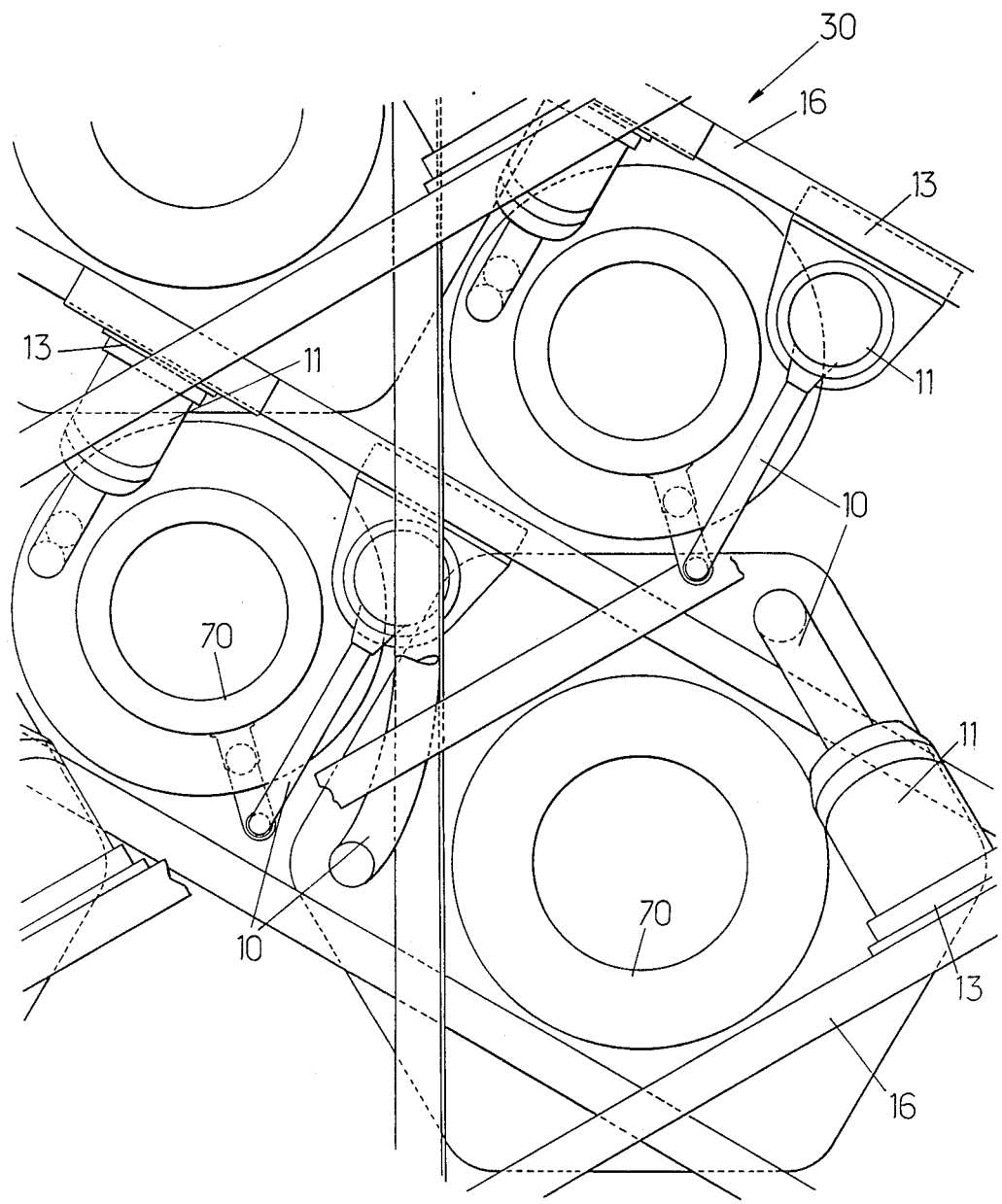

A third section 23 comprises a second multicables connector 6' to which other independent third sections of other second cables are also connected. The connector 6 is adapted to be quickly connected to and disconnected from the first multicables connector 6. The third section has at a distal end thereof the movable fifth connctor 14 adapted to be connected to the fixed sixth connector fixed on plate 8 remote from the reactor. The multicables connectors 6' are disposed at the periphery of the cable layers disposed horizontally above the reactor. Support means for the second cables include:

means for supporting the first sections including sets of rigid parts or conduits 16 disposed above the cover of the reactor in parallel layers (see FIGS. 1a, 1b and 2), means for supporting the rigid bars including a modular metal structure 30 shown schematically in FIG. 1b and in FIG. 2 with dot dash lines, or in FIGS. 3 and 5, holding each layer of parallel bars in position and providing at least partially the path for the second sections 21 of the second cables 12 as far as the corresponding multicables connector 6.

The bars in the same layer are identical and may provide the same function. Their lengths varies as a function of their geographic position above the cover and of the number of electric apparatus to be served. By same function should be understood power function, or temperature control function, etc... The bars may be readily prefabricated and disposed on supporting frameworks 30, which makes possible a simpler installation more readily dismantled. The support means for the second cables also include means 7 for supporting the third sections 23 which are adapted to pivot about at least one pivot 31. These supports 7 group together solely the third sections associated with a whole number of second multicables conductors, disposed advantageously in the same geographic position about the reactor. The rigid bar 16 for supporting the first sections 18 of the second cable 12 are formed by a closed metal sheath containing the portions embedded in an insulating product resisting to irradiation.

Figure 6:
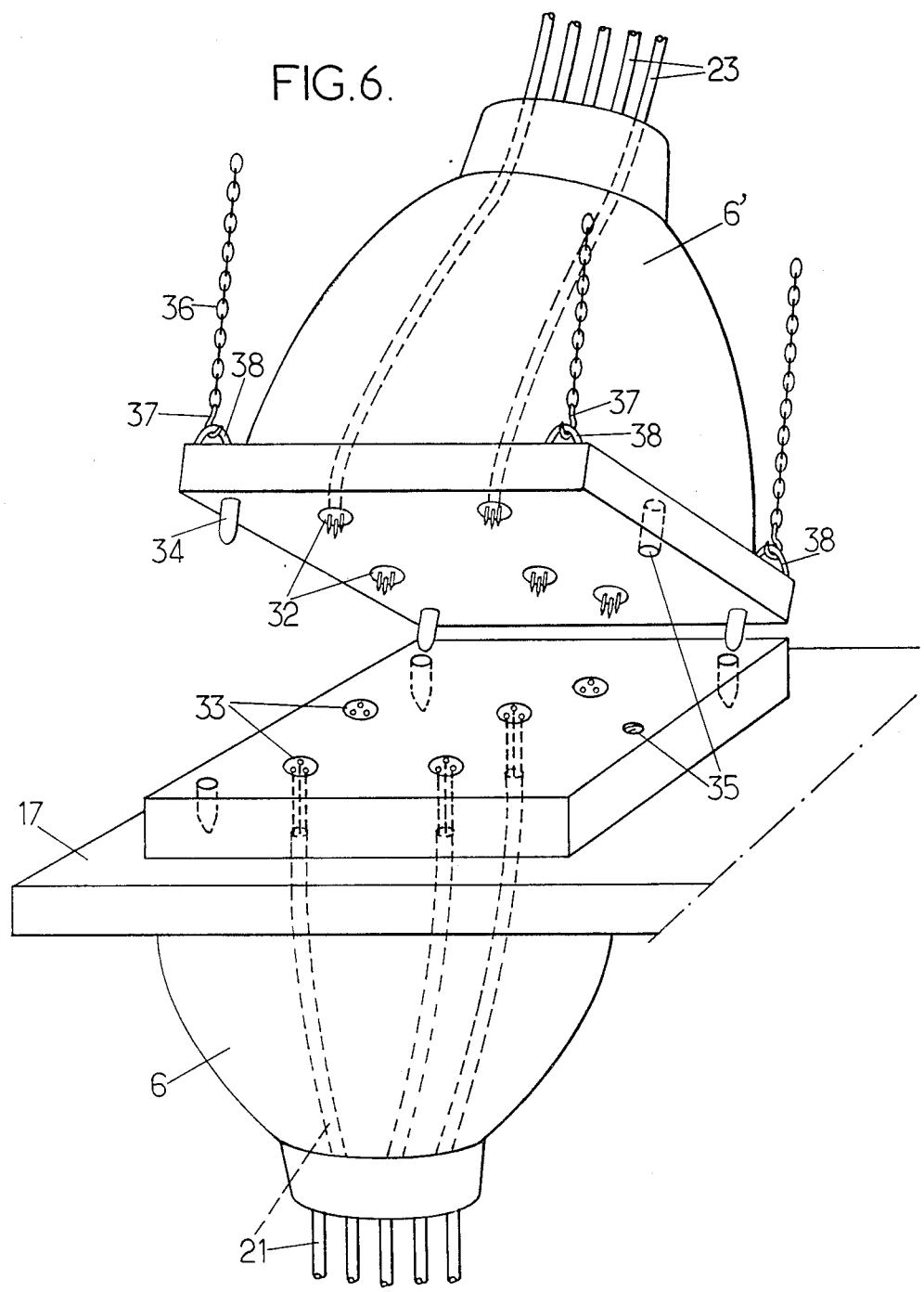
Figure 7:
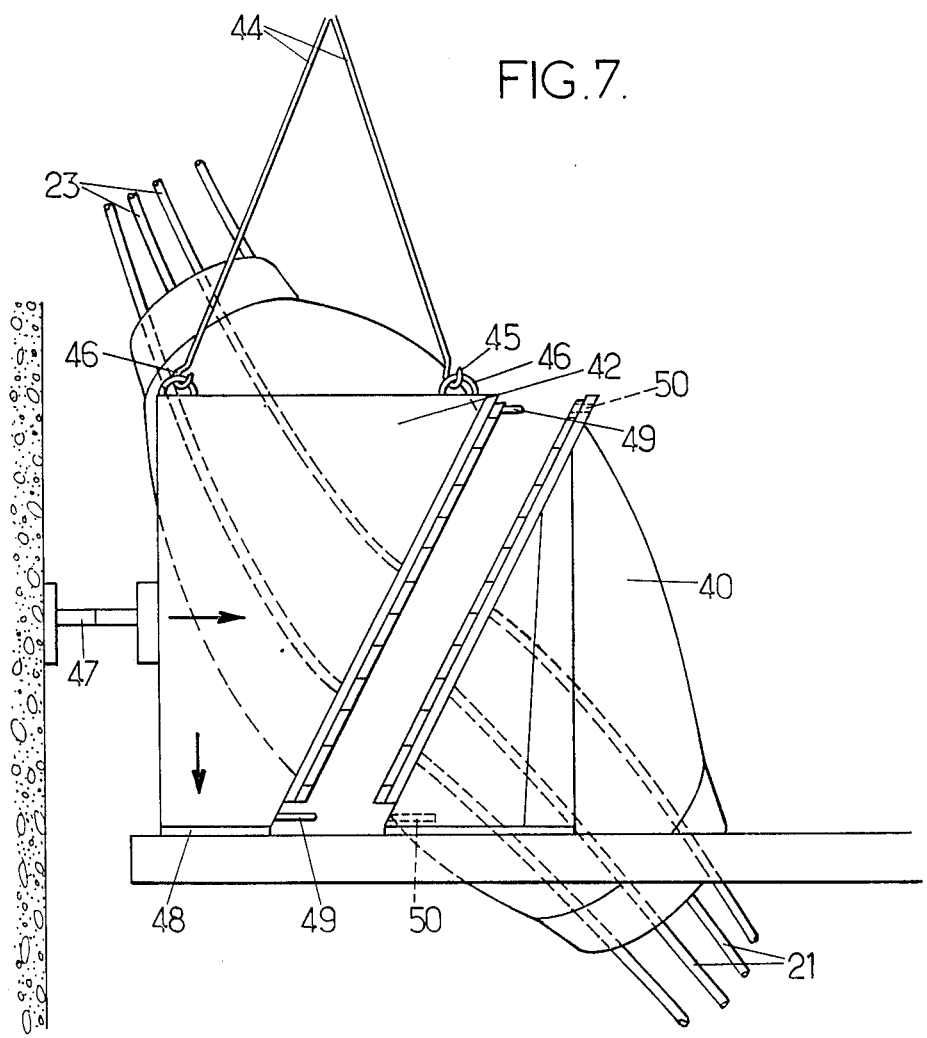

The multiple connectors 6, 6' may be manually connectable and disconnectable as shown schematically in FIG. 6, or automatically connectable and disconnectble as shown in FIG. 7.

FIG. 6 shows a multicables connector in which male pins or electrical contacts of third section 23 of the second cables 12 are plugged into female sockets 33 having electrical contacts of a corresponding second section 21 and means 34 making it possible to connect the multicables connector 6 on its corresponding multicables connector 6' without error. A device for clamping and holding the multicables connector 6 on the multicables connector 6', shown sschematically at 35, ensures good resistance of the assembly to possible external forces.

In FIG. 6, the multicables connectors 6' are handled by means of slings 36 fixed to the connectors 6' by hooks 37 hooked into rings 38 belonging to the connector 6'.

In FIG. 7, two automatically connectable and disconnectable multicables connectors have been shown schematically. The multicables connector 40 fastened to the second sections 21 is fixed to support 17. The multicables connector 42 fastened to the third sections 23 is postioned by means of an overhead crane (not shown in the drawings). Slings 44, having hooks 45, are fixed to rings 46 secured to the multicable connector 42. An adequate device 47, known per se, for moving connector 42 longitudinally towards connector 40 is then positioned. Guide means 48, formed for example by slides, make it possible to drive the connector 42 closer to connector 40 be means of the adequate device 47 and to plug them one into the other.

Foolproof and centering means 49, 50 make it possible to position the multicables connector without any error or risk.

In a preferred embodiment of the invention, illustrated in FIG. 2, the inputs or outputs of the first sections 18 of the second cable 12 adapted to be connected respectively to the coupling connector 11 of the first cable 10 and located above the cover 2 of the reactor, are placed regularly on the lateral portions of the corresponding bar 16, depending on the position of the fixed connector situated above the cover to which the inputs or outputs are connected.

Similarly, the second cable will advantageously have their second section end connector 19 situated at the input in the support bar 16 of the first section of each of the second cables.

These bars 16 may be readily prefabricated and disposed on support frameworks 30 which makes possible a simple layer by layer installation. The distribution points placed evenly along the bar at the pitch of the components to be supplied, may either be a cable output, or a multipin connector.

FIG. 3 shows, in a top view, at the level of the multiple connector 6, the lead in for cables 21 coming from bars 16.

Figure 4:
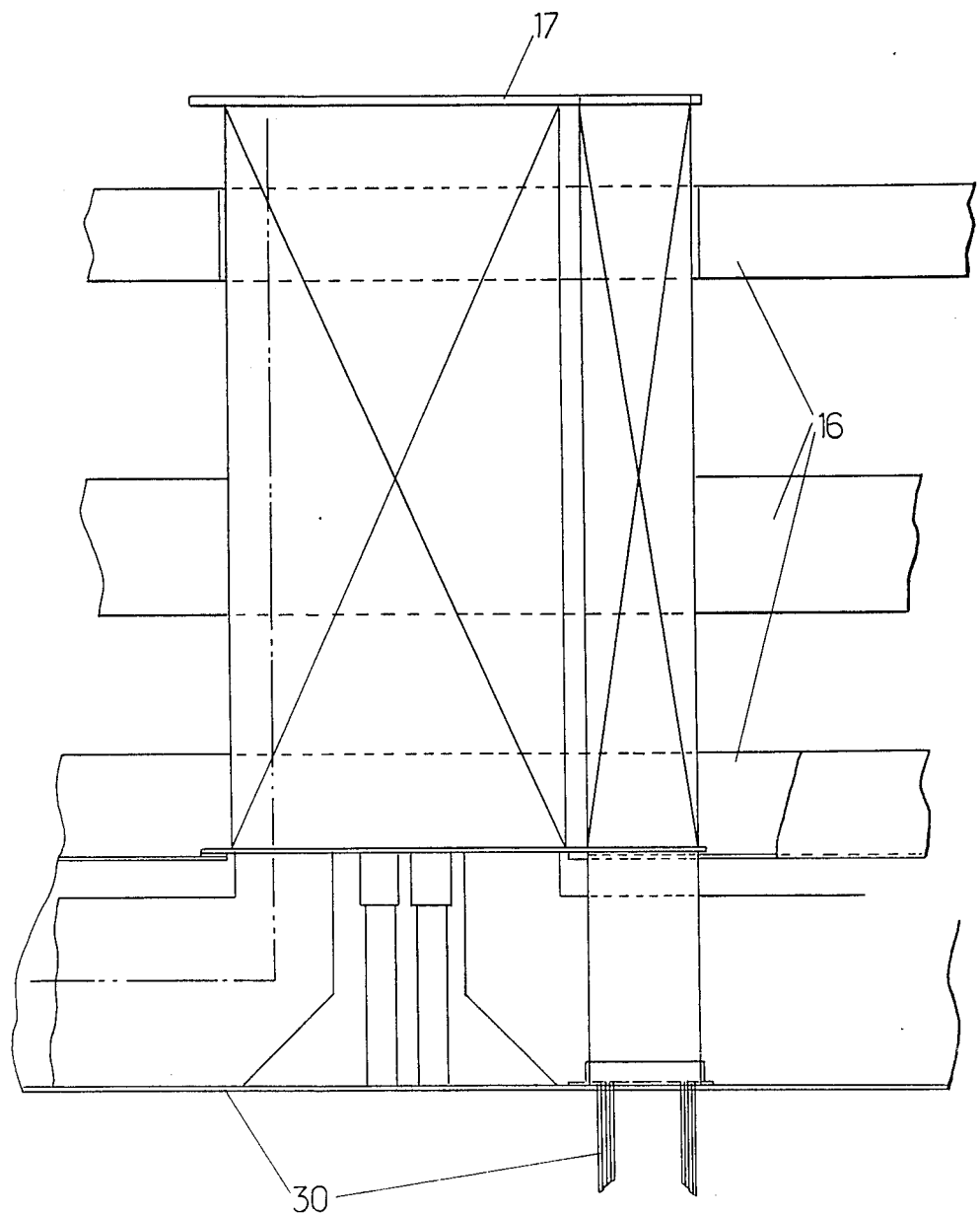

FIG. 4 shows a detail view in elevation of three superimposed layers of bars 16 in which extend the cables of an installation according to the invention. A support 17 makes it possible to fix thereto a multicables connector of the invention.

FIG. 5 shows in a top view and in greater detail an installation of the invention. The modular metal structure 13 can be seen as well as the top parts, external to the vessel of the reactor, of the control clusters 70. Connectors 11 for coupling the first cable 10 are connected to bars 16 by means of movable connectors 13 of the first section 18 (not shown).

The operation carried out during dismantling of an electric device wiring installation constructed in accordance with the invention will be described briefly hereafter.

The multiwire cables associated previously with the same multicables connector are disconnected simultaneously, on the one hand at the level of the multiple connectors, and the other hand at the level of the fixed intermediate plate situated remote from the reactor vessel. Then the support 7 of the third sections of the second cables are raised by pivoting them so as to free the access above the reactor. The rest of the installation is then removed, simultaneously with removal of the cover.

We claim:

1. In combination with a nuclear reactor having a vessel provided with a removable cover, a wiring installation for elctrical connections of a plurality of devices of the nuclear reactor, comprising:

(a) a plurality of first multiwire cables each extending at least from certain ones of said devices and terminated with a first connector located above said cover at an end remote from said device, (b) a plurality of second multiwire cables each for connection with a respective one of the first cables and each having:

($b_1$) a first section having at a proximal end thereof one second connector for disconnectable connection to one of said first connectors and at a distal end thereof a third connector, ($b_2$) a second section having at a proximal end thereof a fourth connector for disconnectable connection to said third connector and at a distal end thereof a first multicables connector having a plurality of electrical contacts connected to respective wires of said second section, said first multicables connector being common to at least ten independent second sections, ($b_3$) a third section having at a proximal end thereof a second multicables connector having a plurality of electrical contacts connected to respective wires of said third section and corresponding to respective wires of said second section, said second multicables connector being common to at least ten independent third sections corresponding to said independent second sections for removable connection to said first multicables connector, and at a distal end thereof a fifth connector for connection with a respective sixth connector fixed on a plate remote from the reactor vessel, and further comprising:

(c) a plurality of movable supports each for receiving all those of said third sections which are connected to predetermined ones of said second multicables connectors, all said third sections being supported by respective ones of said movable supports and each of said supports being movable between a position where the respective second multicables connector is coupled with the associated first multicables connector and a second position where the movable support clears the access above the nuclear reactor vessel.

2. In combination with a nuclear reactor having a vessel provided with a removable cover, a wiring installation for electrical connection of a plurality of devices of the nuclear reactor, comprising:

(a) a plurality of first multiwire cables each extending at least from certain ones of said devices and terminated with a first connector located above said cover at an end remote from said device, (b) a plurality of second multiwire cables each for connection with a repsective one of the first cables and each having:

(b₁) a first section having at a proximal end thereof one second connector for disconnectable connection to one of said first connectors and at a distal end thereof a third connector, (b₂) a second section having at a proximal end thereof a fourth connector for disconnectable connection to said third connector and at a distal end thereof a first multicables connector having a plurality of electrical contacts connected to respective wires of said second section, said first multicables connector being common to at least ten independent second sections, (b₃) a third section having at a proximal end thereof a second multicables connector having a plurality of electrical contacts connected to respective wires of said third section and corresponding to respective wires of said second section, said second multicables connector being common to at least ten indenpendent third sections corresponding to said independent second sections for removable connection to said first multicables connector, and at a distal end thereof a fifth connector for connection with a respective sixth connector fixed on a plate remote from the reactor vessel, and furthr comprising (c) supporting means for all said cables, having:

first sections supporting means comprising a plurality of rigid conduits arranged above the cover in a plurality of horizontal layers , the conduits in each layer being parallel to each other and the conduits in separate layers having different directions, and, conduit supporting means comprising a modular metallic structure supporting each one of said plurality of layers and carried by said removable cover.

3. A wiring installation according to claim 2, wherein said supporting means for said second multiwire cables further comprise third section supporting means, said third section supporting means having a plurality of movable supports arranged for pivotal movement about one fixed horizontal axis and each supportng a plurality of third sections corresponding to a plurality of second multicables connectors connected thereto.

4. A wiring installation according to claim 2, wherein said rigid conduits are each formed with a sealed metallic duct for containing a plurality of first sections of second multiwire cables, said first sections being drowned into an isolating product resisting to radiations.

5. A wiring installation according to claim 2, wherein the first multiwire cables penetrate into corresponding rigid conduits through penetrations, said penetrations being regularly disposed on lateral surfaces of said conduits according to the position of the device connected to said first multiwire cables.

6. A wiring installation according to claim 2, wherein each second connector is fixed on the surface of a corresponding conduit.

7. A wiring instalation according to claim 2, wherein at least some of the second multiwire cables have their third connector fixed on a lateral surface of the corresponding conduit.

8. A wiring installation according to claim 1, wherein each of the second multicables connector is remotely connectable to and disconnectable from the respective first multicables connector by moving said second multicables connector toward and away from the first multicables connector, co-operating centering means being provided on said first and second multicables connectors.

* * * * *

UNITED STATES PATENT AND TRADEMARK OFFICE
CERTIFICATE OF CORRECTION

PATENT NO. : 4,857,265

DATED : August 15, 1989

INVENTOR(S) : Dejeux et al.

It is certified that error appears in the above-identified patent and that said Letters Patent is hereby corrected as shown below:

On the title page:

The names of the inventors should read as --POL Dejeux--and Guy Desfontaines--.

Item [19]POL etal. should read -- Dejeux et al.

Column 7, line 6, claim 2(b) change "repsective" to --respective--.
         line 26, claim 2($b_3$) change "indenpendent" to --independent--.
         line 33, claim 2($b_3$) change "furthr" to -- further--.

Column 8, line 9, claim 3 change "supportng" to --supporting--.

Signed and Sealed this

Eighth Day of December, 1992

Attest:

DOUGLAS B. COMER

Attesting Officer      Acting Commissioner of Patents and Trademarks